(12) United States Patent
Sutardja et al.

(10) Patent No.: US 8,111,050 B2
(45) Date of Patent: Feb. 7, 2012

(54) POWER FACTOR CONTROL SYSTEMS AND METHODS

(75) Inventors: Sehat Sutardja, Los Altos Hills, CA (US); Jianqing Lin, Pleasanton, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 12/902,440

(22) Filed: Oct. 12, 2010

(65) Prior Publication Data

US 2011/0026284 A1    Feb. 3, 2011

Related U.S. Application Data

(63) Continuation of application No. 12/115,175, filed on May 5, 2008, now Pat. No. 7,812,576, which is a continuation-in-part of application No. 11/977,869, filed on Oct. 26, 2007, now Pat. No. 7,511,460, which is a continuation of application No. 10/949,624, filed on Sep. 24, 2004, now Pat. No. 7,292,013.

(60) Provisional application No. 61/038,630, filed on Mar. 21, 2008.

(51) Int. Cl.
  *G05F 1/575* (2006.01)
  *G05F 1/70* (2006.01)
(52) U.S. Cl. .......... 323/207; 363/89; 323/283; 323/284; 323/285
(58) Field of Classification Search .................. 323/205, 323/207, 222, 282, 284, 285; 363/89, 125
  See application file for complete search history.

(56) References Cited

U.S. PATENT DOCUMENTS

| 4,688,162 | A | 8/1987 | Mutoh et al. |
| 4,761,725 | A | 8/1988 | Henze |
| 5,508,602 | A | 4/1996 | Borgato et al. |
| 5,614,812 | A | 3/1997 | Wagoner |
| 5,638,265 | A | 6/1997 | Gabor |
| 5,757,635 | A | 5/1998 | Seong |
| 5,793,624 | A | 8/1998 | Couture et al. |
| 5,905,369 | A | 5/1999 | Ishii et al. |
| 6,043,633 | A | 3/2000 | Lev et al. |
| 6,448,745 | B1 | 9/2002 | Killat |
| 6,753,798 | B2 | 6/2004 | Feldtkeller |

(Continued)

FOREIGN PATENT DOCUMENTS

DE   EP A 1 324 476   7/2003

(Continued)

OTHER PUBLICATIONS

Technology (pulseTrain); iWatt, technology; http://www.iwatt.com/techhology/...; 2 pages; Aug. 20, 2003.
Notification of Transmittal of the Internat'l Search Report & The Written Opinion of the Internat'l Searching Authority, or the Declaration dated Sep. 28, 2008 in PCT/US08/064487.

(Continued)

*Primary Examiner* — Gary L Laxton

(57) ABSTRACT

A boost converter comprises an inductance that receives an input signal. A switch controls current supplied by the inductance to a load. A power factor control module comprises a mode control module that selects an operating mode of the boost converter and a switch control module that switches the switch at a frequency. The frequency is equal to a first frequency when the mode control module selects a continuous mode and equal to a second frequency when the mode control module selects a discontinuous mode. The first frequency is greater than the second frequency.

22 Claims, 10 Drawing Sheets

U.S. PATENT DOCUMENTS

| | | |
|---|---|---|
| 6,831,449 B2 | 12/2004 | Nishida et al. |
| 6,906,503 B2 | 6/2005 | Lopez-Santillana et al. |
| 6,944,034 B1 | 9/2005 | Shteynberg et al. |
| 6,946,819 B2 | 9/2005 | Fagnani et al. |
| 7,266,001 B1 | 9/2007 | Notohamiprodjo et al. |
| 7,292,013 B1 | 11/2007 | Chen et al. |
| 7,295,452 B1 * | 11/2007 | Liu ................................. 363/82 |
| 7,511,460 B1 | 3/2009 | Chen et al. |
| 7,812,576 B2 * | 10/2010 | Sutardja et al. ............... 323/222 |
| 7,821,237 B2 * | 10/2010 | Melanson ..................... 323/222 |

FOREIGN PATENT DOCUMENTS

| | | |
|---|---|---|
| EP | 1324476 | 7/2003 |
| WO | WO99/63414 A | 12/1999 |
| WO | WO 99/63414 A | 12/1999 |

OTHER PUBLICATIONS

Ashok Bindra; Power Supply Controller Keeps Efficiency High Across All Loads; Electronic Design; Dec. 3, 2001, Cover Story; 3 pages; Penton Publication.

Technology (pulseTrain); iWatt, technology; http://www.iwatt.com/technology/...; 2 pages; Aug. 20, 2003.

Notification of Transmittal of the International Search Report and The Written Opinion of the International Searching Authority, or the Declaration dated Sep. 29, 2008 in reference to PCT/US2008/064487.

\* cited by examiner

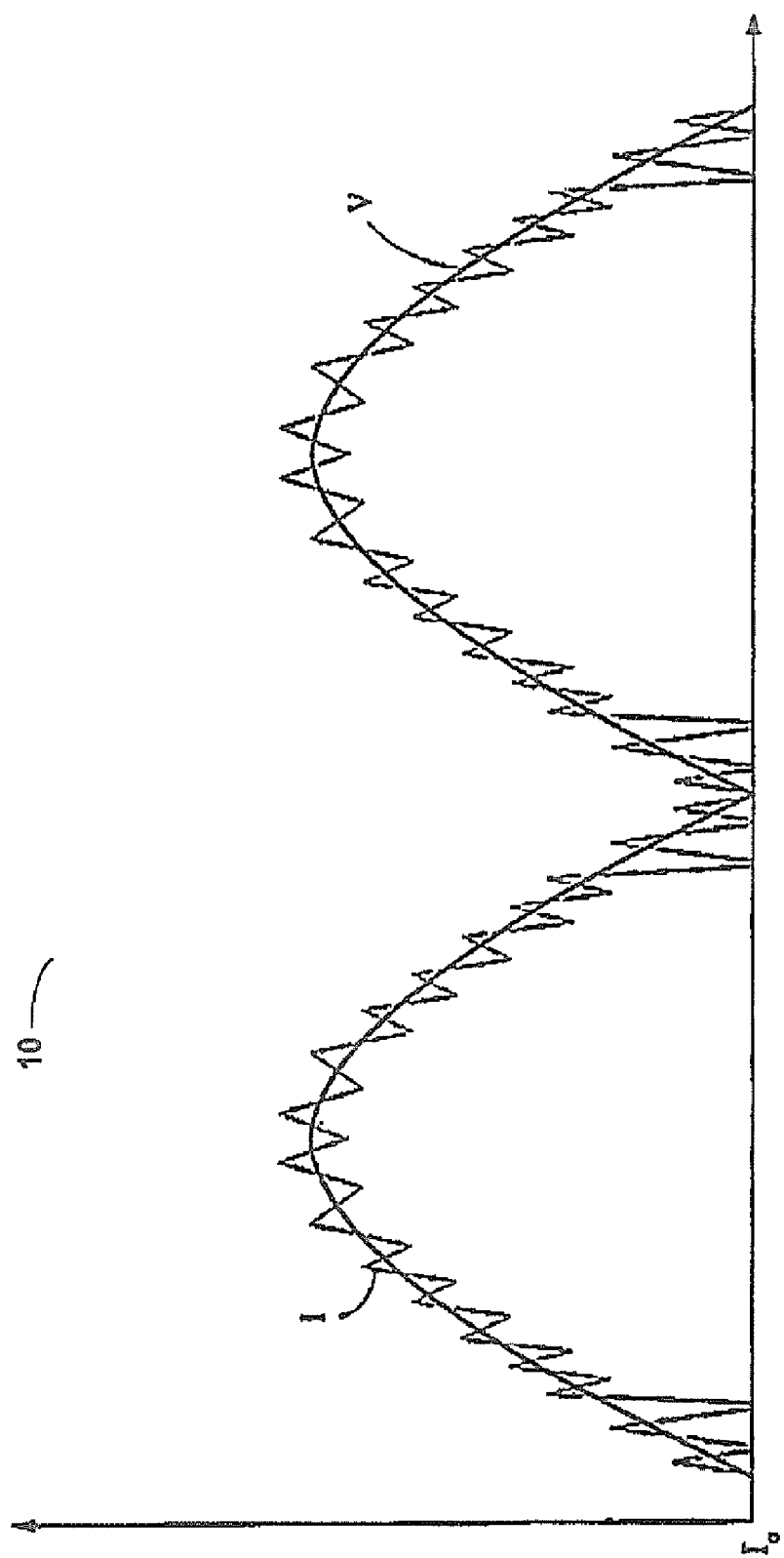

POWER FACTOR CONTROL SYSTEMS AND METHODS

CROSS-REFERENCE TO RELATED APPLICATIONS

This application is a continuation of U.S. application Ser. No. 12/115,175, filed May 5, 2008, which claims the benefit of U.S. Provisional Application No. 61/038,630, filed Mar. 21, 2008 and is a continuation-in-part of U.S. patent application Ser. No. 11/977,869 filed on Oct. 26, 2007, which is a continuation of U.S. Pat. No. 7,292,013 issued on Nov. 6, 2007. The disclosures of the above-identified applications and patents are incorporated herein by reference in their entirety.

This application may be related to U.S. Pat. No. 7,266,001, issued on Sep. 4, 2007, which is incorporated herein by reference in its entirety.

FIELD

The present disclosure generally relates to power factor correction control systems and methods.

BACKGROUND

The statements in this section merely provide background information related to the present disclosure and may not constitute prior art.

A load may appear to a power supply as a resistive impedance, an inductive impedance, a capacitive impedance, or a combination thereof. When the current passing to the load is in phase with the voltage applied to the load, the power factor approaches one.

When the power factor is less than one, transmitted power can be wasted (due to phase mismatch between current and voltage) and/or noise may be introduced into the power line. To reduce noise and improve efficiency, power supplies generally use power factor correction (PFC) circuits to control the phase of the current waveform relative to the phase of the voltage waveform.

Referring now to FIG. 1, a conventional boost converter 10 includes rectifier 15, which receives alternating current (AC) power. Input current Iin passes through inductor 20 and part of input current Iin passes through diode 50 (having a capacitor/filter 60 at its output) before being applied to load 70.

Power factor controller 30 controls the current flowing through inductor 20 by turning switch 40 on and off in response to an AC voltage-sensing input 12, a DC output voltage 72, a sensed power conversion current from a second inductor coil 25, and a feedback current via node 34. When switch 40 is on, current 22 generally flows through inductor 20 (thereby storing some energy in inductor 20) and then through switch 40 to ground. When switch 40 is off, current 52 may flow through diode 50 and some charge may collect on capacitor/filter 60. Generally, current flow 22 through inductor 20 is significantly reduced or even prevented when the switch 40 is off.

Referring now to FIG. 2, an AC voltage V received by boost converter 10 is shown. Input voltage V is a rectified half-sine wave of the AC waveform input. However, due to the on/off cycles of switch 40 (controlled by power factor controller 30 in FIG. 1), the current waveform I in FIG. 2 has a sawtooth pattern. After passing the sawtooth waveform I through a low-pass filter (e.g., high frequency bypass capacitor/filter 60 in FIG. 1), the input current waveform resembles the input AC voltage at the input of rectifier 15.

The PF for the conversion approaches 1 under most conditions, particularly those conditions where the loading power is sufficiently high to allow an appreciable average input current to continuously pass through inductor 20. This mode is known as the "average current mode" or "continuous mode" of operation for boost converter 10.

The PFC for a boost converter generally has two parameters defined by a specification: (1) PF, and (2) total harmonic distortion (or THD). THD refers to distortion caused generally by higher order harmonics. For a 60 Hertz (Hz) AC signal, higher order harmonics are located at 120 Hz, 180 Hz, or other n*60 Hz values, where n is an integer of 2 or more. Generally, the higher the THD, the lower the efficiency. Harmonic distortion can saturate inductor 20 in boost converter 10. Moreover, if the THD is sufficiently high, noise can be fed back onto the AC power lines 12-14, which is undesirable.

Referring now to FIG. 3A, a low-power and/or low-voltage portion 120 of the voltage and current waveforms of FIG. 2 are shown. The voltage waveform V is the voltage at the output of rectifier 15 (see FIG. 1). The current waveform I is the input current Iin passing through inductor 20. When switch 40 in FIG. 1 is turned on at time t0, current I increases in a substantially linear manner, as shown by slope 122. Switch 40 is on for a period of time determined by power factor controller 30. At the end of this time (point 124 on the current waveform I in FIG. 3A), switch 40 turns off and current I decreases in a substantially linear manner. Switch 40 then is turned on again by power factor controller 30 (see FIG. 1) after a period of time ts–t0, also determined by power factor controller 30.

When current I=0 (i.e., I0, the current value during "zero current period" 126 in FIG. 3A), the average current or continuous mode of operation has a potential distortion issue. The THD cannot be controlled during the zero current period 126 of waveform portion 120 because there is no current flowing through inductor 20 of FIG. 1.

The discontinuous mode of operation of boost converter 10 occurs during periods of time where switch 40 is turned on and off for lengths of time sufficient for zero current periods to occur. The critical mode of operation occurs when current waveform I (see FIG. 3A) is at or near zero (I0). It is desirable to maximize the amount of time that the inductor current Iin is above zero (see FIG. 1) and to minimize the zero current periods (e.g., zero current period 126 of FIG. 3A).

Referring now to FIG. 3B, ideally ts would occur at a point in time when current I crosses I0 (the "I=0" axis), zero current period 126 would have a duration as close to 0 units of time as possible, and switch 40 (see FIG. 1) would be turned on essentially immediately by power factor controller 30 (see FIG. 1) after current waveform portion 134 intersects I0 (see FIG. 3B). When this occurs, current waveform portion 136 increases soon after current waveform portion 134 intersects I0 and current to flow through inductor 20 (see FIG. 1) substantially continuously. The switch 40 should not be turned on too soon (i.e., before current waveform portion 134 in FIG. 3B intersects I0). When this occurs, the average input current may increase at too high a rate, which could cause the input current waveform phase to move out of alignment with the input voltage waveform phase.

One conventional approach detects the input current Iin flowing through inductor 20 in FIG. 1. A second inductor coil 25 magnetically coupled to the inductor 20 senses the current Iin flowing through inductor 20. However, this approach suffers from latency when sensing the current in another coil. The latency introduces some positive length of time in the zero current period 126 (see FIG. 3A) and noise back into the AC power line 12-14. Also, the second inductor coil 25 adds some expense to manufacturing power factor controller 30 and necessitates at least one dedicated differential pin on power factor controller 30 to receive information from second inductor coil 25.

Another approach attempts to sense the current at node 34 in FIG. 1. However, the current and voltage values at node 34 are relatively low in the critical mode of operation. As a result, error signals based on the measurement are relatively inaccurate. Also, determining the current at node 34 would require power factor controller 30 to have a relatively high sampling rate (i.e., >>1 sample taken every 1/[ts−t0] seconds) in the critical mode, and the sampling resolution should be relatively high to avoid turning switch 40 on too fast or too slow.

SUMMARY

A boost converter comprises an inductance that receives an input signal. A switch controls current supplied by the inductance to a load. A power factor control module comprises a mode control module that selects an operating mode of the boost converter; and a switch control module that switches the switch at a frequency. The frequency is equal to a first frequency when the mode control module selects a continuous mode and equal to a second frequency when the mode control module selects a discontinuous mode. The first frequency is greater than the second frequency.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 2 is a graph depicting voltage and current waveforms at particular nodes in the conventional boost converter of FIG. 1.

DETAILED DESCRIPTION

Figure 1:
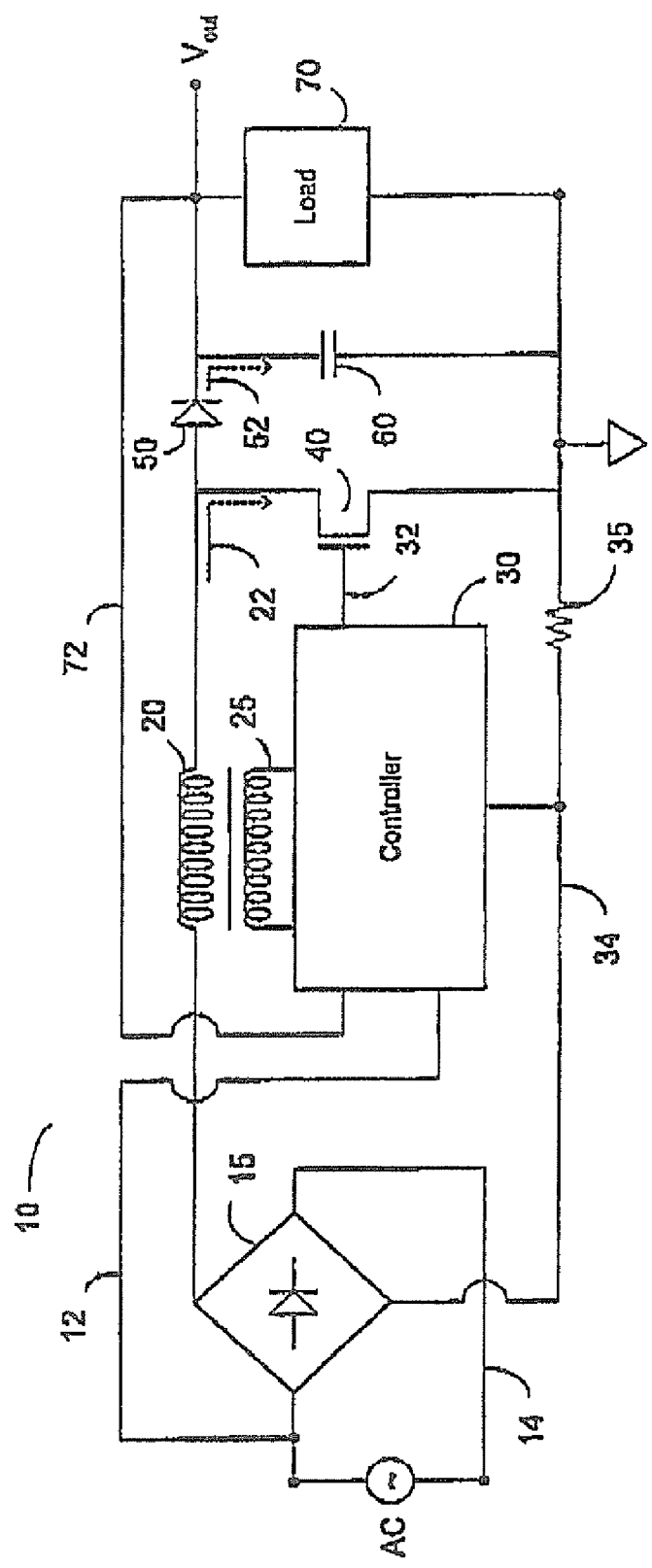
FIG. 1 is a diagram showing a conventional boost converter.
Figure 3A:
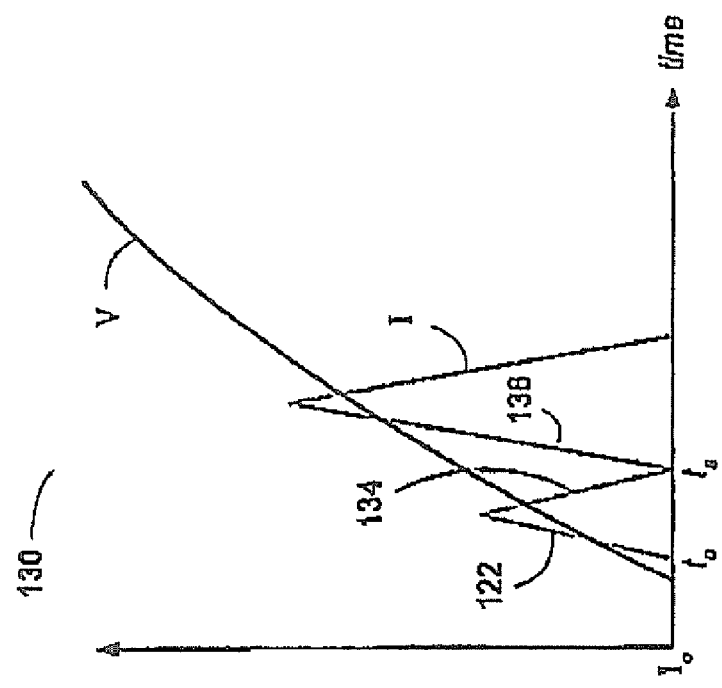
FIGS. 3A-3B are graphs depicting a low-voltage and low-current portion of the waveforms of FIG. 2.
Figure 3B:
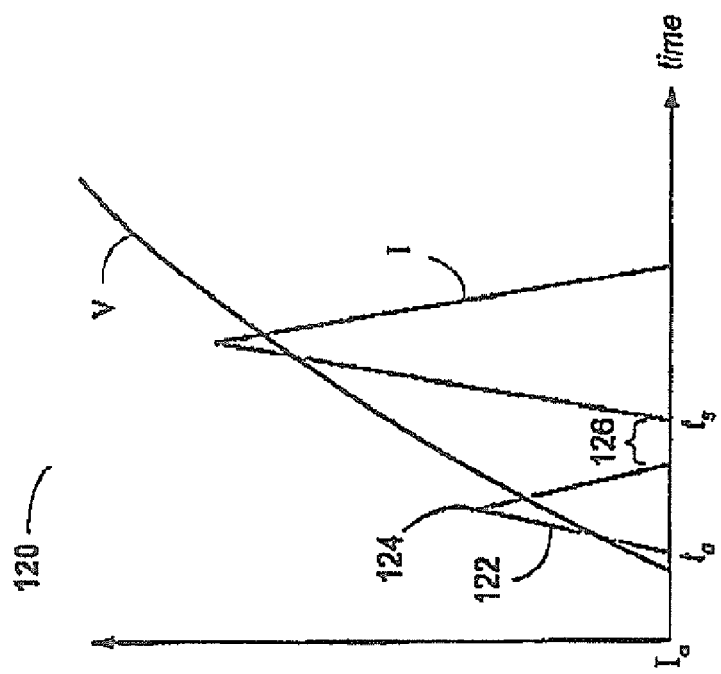

Reference will now be made in detail to the preferred embodiments of the disclosure, examples of which are illustrated in the accompanying drawings. While the disclosure will be described in conjunction with the preferred embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be readily apparent to one skilled in the art that the present disclosure may be practiced without these specific details. In other instances, well-known methods, procedures, components, and circuits have not been described in detail so as not to unnecessarily obscure aspects of the present disclosure.

Some portions of the detailed descriptions which follow are presented in terms of processes, procedures, logic blocks, functional blocks, processing, and other symbolic representations of operations on data bits, data streams or waveforms within a computer, processor, controller and/or memory. These descriptions and representations are generally used by those skilled in the data processing arts to effectively convey the substance of their work to others skilled in the art. A process, procedure, logic block, function, operation, etc., is herein, and is generally, considered to be a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared; and otherwise manipulated in a computer, data processing system, or logic circuit. It has proven convenient at times, principally for reasons of common usage, to refer to these signals as bits, waves, waveforms, streams, values, elements, symbols, characters, terms, numbers, or the like.

It should be borne in mind, however, that all of these and similar terms are associated with the appropriate physical quantities and are merely convenient labels applied to these quantities. Unless specifically stated otherwise and/or as is apparent from the following discussions, it is appreciated that throughout the present application, discussions utilizing terms such as "processing," "operating," "computing," "calculating," "determining," "manipulating," "transforming," "displaying" or the like, refer to the action and processes of a computer, data processing system, logic circuit or similar processing device (e.g., an electrical, optical, or quantum computing or processing device), that manipulates and transforms data represented as physical (e.g., electronic) quantities. The terms refer to actions, operations and/or processes of the processing devices that manipulate or transform physical quantities within the component(s) of a system or architecture (e.g., registers, memories, other such information storage, transmission or display devices, etc.) into other data similarly represented as physical quantities within other components of the same or a different system or architecture.

Furthermore, for the sake of convenience and simplicity, the terms "data," "data stream," "waveform," and "information" are generally used interchangeably herein, but are generally given their art-recognized meanings. Also, for convenience and simplicity, the terms "connected to," "coupled with," "coupled to" and "in communication with" may be used interchangeably (which terms may also refer to direct and/or indirect relationships between the connected, coupled and/or communication elements unless the context of the term's use unambiguously indicates otherwise), but these terms are also generally given their art-recognized meanings. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or.

The present disclosure concerns a circuit, system, method, and software for power factor correction and/or control. The present disclosure generally takes a computational approach to reducing and/or minimizing zero current periods in the critical mode of boost converter operation. One inventive circuit is a power factor controller, comprising (a) a circuit configured to determine and/or identify (i) a period of a periodic power signal and (ii) a length of time from a beginning of the period during which a potential is applied to a power conversion switch; (b) a voltage calculator configured to determine at least a peak voltage of the periodic power signal; and (c) logic configured to calculate a time period to open the switch in response to (i) the length of time, (ii) the power signal period, and (iii) the peak voltage. The system generally comprises the present power factor controller and a switch that it controls, although a further aspect of the system relates to a power converter comprising such a system and an inductor or other means for storing energy from a periodic power signal, such as an AC power signal.

A further aspect of the disclosure concerns a method of correcting and/or controlling a power factor and/or controlling a power conversion. The method generally comprises (1) storing energy from a periodic power signal in a power converter in response to application of a potential to switch in electrical communication with the power converter; (2) calculating a time period to open the switch from (i) an initial length of time during which a potential is applied to the switch, (ii) a period of the periodic power signal, and (iii) a peak voltage of the periodic power signal; and (3) opening the switch during the time period. The software comprises a processor-readable or -executable set of instructions generally configured to implement the present method and/or any process or sequence of steps embodying the inventive concepts described herein.

The disclosure, in its various aspects, will be explained in greater detail below with regard to exemplary embodiments.

An Exemplary Boost Converter

In one aspect, the present disclosure relates to a power converter, comprising the present power factor controller (described in greater detail below), an inductor configured to store energy from a periodic power signal, and a power conversion switch configured to charge the inductor when a potential is applied to the switch. Generally, the switch is controlled by the present power factor controller, and the periodic power signal is either an alternating current (AC) power signal or a rectified AC power signal. In one implementation, the power converter is an AC-DC boost converter.

In various embodiments, the power converter may further comprise a diode configured to receive an output from the inductor and provide an output voltage to a load; a ripple filter coupled to an output of the diode; and/or a rectifier configured to rectify an alternating current power signal. In one embodiment, the periodic power signal comprises an output of the rectifier (e.g., it is a rectified AC power signal).

In other embodiments, the inductor converts the periodic power signal (e.g., the AC signal) into a substantially constant power signal (e.g., a DC signal); and/or the switch may be configured to (i) provide a power conversion current to the inductor when a potential is applied to it (e.g., when it is closed) and/or (ii) reduce, eliminate or prevent a power conversion current from passing through the inductor when the switch is open.

Figure 4:
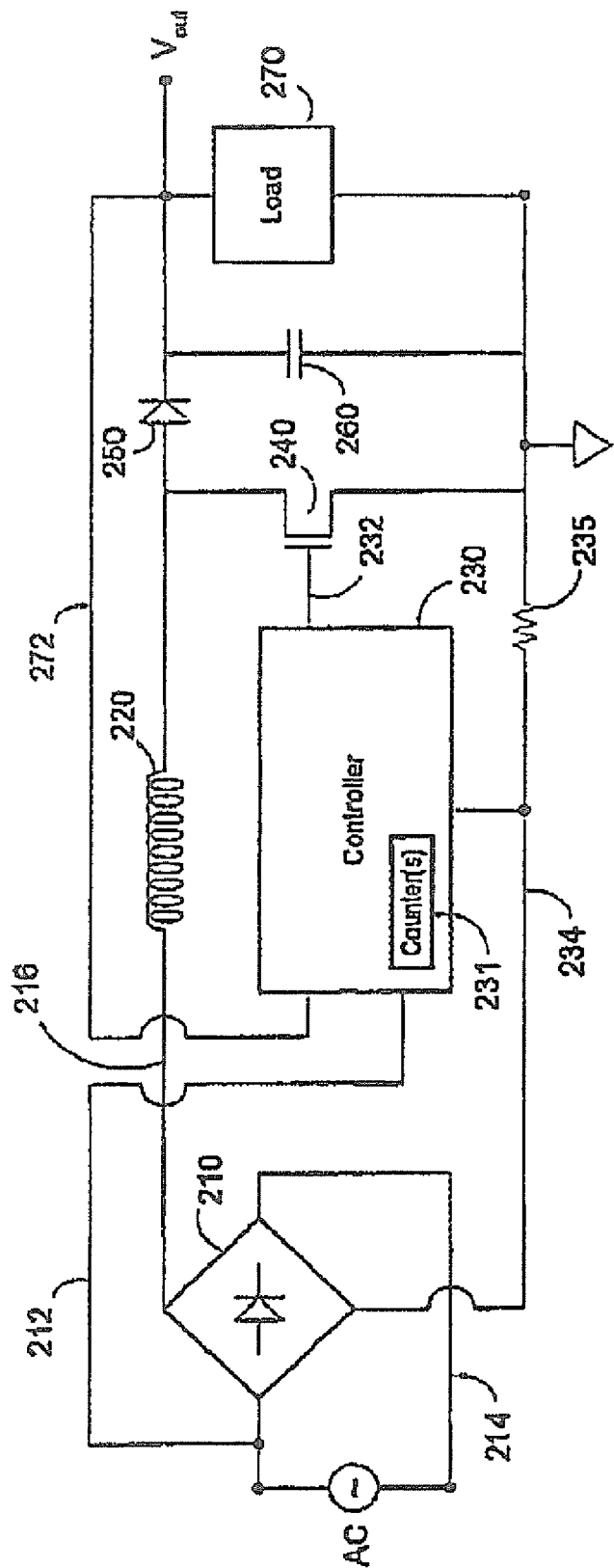
FIG. 4 is a diagram of an exemplary boost converter according to the present disclosure.

The operation of the present power factor controller and power converter may be best explained with reference to an exemplary embodiment. FIG. 4 shows a first exemplary embodiment of a boost converter 200, including four-way rectifier 210 receiving alternating current power supply AC from power lines 212 and 214, inductor 220, exemplary power factor controller 230, and switch 240. Boost converter 200 may further include current feedback resistor 235, diode 250, and capacitor/filter 260, the node 272 to which may also be in communication with load 270. Similarly to the conventional power factor controller 30 of FIG. 1, power factor controller 230 of FIG. 4 effectively controls the current flowing through inductor 220 by turning switch 240 on and off in response to AC power line 212, DC output voltage 272, and feedback current node 234. However, the present power factor controller 230 computes the length of time that switch 240 remains off in order to reduce or minimize zero current periods, and does not require a second inductor to sense when the input current through inductor 220 is zero.

For example, in FIG. 4, when switch 240 is on, a current generally flows through inductor 220 thereby storing some energy in inductor 220. When switch 240 is off, current may flow through diode 250 and some charge may collect in capacitor/filter 260, but generally, current flow through inductor 220 is significantly reduced or prevented. Diode 250 is thus configured to (i) receive an output from inductor 220 and (ii) pass current unidirectionally from the inductor output to a substantially constant output voltage (generally applied to a load 270).

One object of the disclosure is to compute or calculate the length of time that switch 240 is off ("toff") that results in a zero current through inductor 220. If one can compute or calculate ("toff"), then one can determine when to turn switch 240 back on in a manner minimizing the zero current period. The disclosure focuses on a power factor controller configured to conduct such calculations.

Figure 5:
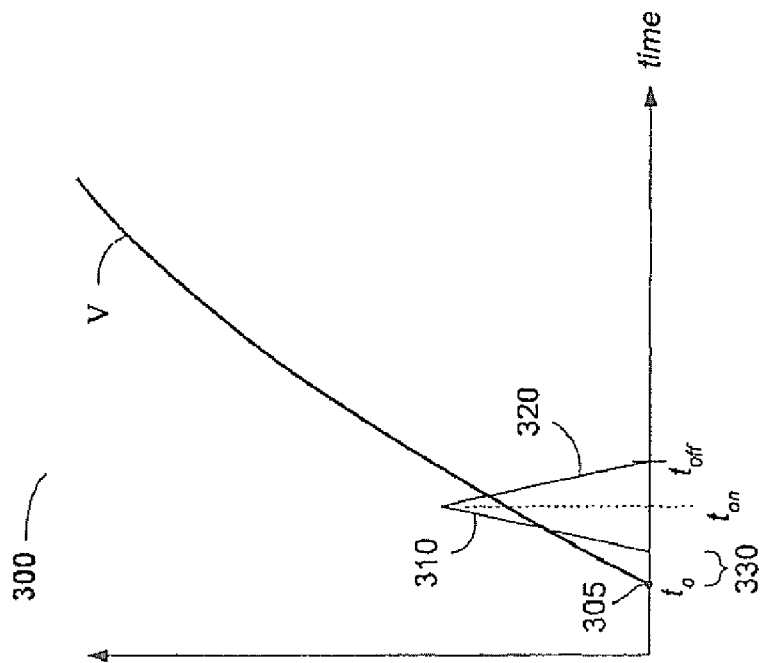

FIG. 5 shows current and voltage waveforms for the exemplary boost converter 200 of FIG. 4 in a critical current mode of operation. Switch 240 is turned on at time t0, causing the current I flow through inductor 220 to increase at a substantially linear rate (e.g., see current waveform section 310 in FIG. 5). Switch 240 remains on for a predetermined length of time ton, where the predetermined length of time may be programmed into a memory unit in power factor controller 230 (see FIG. 4) or may be calculated, computed or determined conventionally by power factor controller 230 in response to one or more conventional inputs (e.g., a current or voltage input from AC power line 212, a power conversion feedback from output voltage Vout node 272 and/or feedback current node 234, etc.). After time ton, power factor controller 230 turns switch 240 off, and current waveform I decreases at a substantially linear rate until current I=0 (e.g., see current waveform section 320 in FIG. 5). The length of time that switch 240 is off for current I to reach 0, toff, can be computed or calculated using relatively simple triangulation techniques from a number of known parameters, including ton, the AC input voltage and the peak AC input voltage Vp on AC power line 212, and the output voltage Vout at node 272. It is well within the abilities of one skilled in the art to design and use logic configured to compute or calculate toff from these known parameters, as will be apparent to those skilled in the art from the following discussion.

The triangulation approach to determining toff is relatively straight-forward. Referring to FIG. 5, the slope of increasing current waveform section 310 is simply the voltage Vin at node 216 divided by the inductance L of inductor 220. Similarly, the slope of decreasing current waveform section 320 is simply the output voltage Vout (at node 272) minus Vin (node 216), divided by L. Current waveform sections 310 and 320 each form the hypotenuse of two right triangles, the abscissa of which is the current Iin through inductor 120 at time ton, and the respective ordinates of which are ton and toff. From these relationships, we can calculate toff. Mathematically, $$\text{Slope}(310)=Vin/L \quad [1]$$

$$\text{Slope}(320)=(Vout-Vin)/L \quad [2]$$

$$toff=ton*Vin/(Vout-Vin) \quad [3]$$

The output voltage Vout is generally predetermined and/or known by design; e.g., it has a specified, substantially constant value (for example, 450 V), although there will be some minor fluctuations in the actual value due to small ripples, the source(s) of which are known to those skilled in the art, but which as a percentage of Vout are insignificant and/or negligible. Thus, for purposes of computing toff, Vout is generally considered to be a constant value. Nonetheless, in one embodiment, Vout is determined (e.g., measured or sampled) every n on/off cycles of switch 240, where n is an integer, and the Vout value may be stored and/or updated in power factor controller 230 as needed or desired for computing toff. At the values of Vout expected to be observed in certain applications of the present disclosure, Vout can be measured relatively accurately with relatively low resolution (at least in comparison with typical values of Iin and/or Vin to be detected in the critical mode at inductor 220 or feedback current node 234).

Also, as discussed above, ton is a known and/or predetermined value for purposes of computing toff. However, the voltage Vin at node 216 is not necessarily a known, predetermined or fixed value at a given point in time during the critical mode of converter operation. Vin can be calculated using known, (pre)determined, fixed or reliably measurable and/or detectable parameter values, though.

The rectified voltage at node 216 is still a half-sine wave, subject to standard trigonometric relationships with other parameters. Thus, if one knows the peak voltage Vp at node 216 and the period of the half-sine wave, one can calculate the value of Vin. Mathematically, $$Vin=Vp*\sin(\pi t/T) \quad [4]$$

where t=ton plus the time 330 from t0 to ton, and T is the period of the rectified voltage half-sine wave (e.g., for a 60 Hz AC power signal, the period T is 1/(2*60 Hz)=8.3 msec). In one embodiment, power factor controller 230 includes one or more counters configured to (i) count the length and/or indicate the end of period T, and/or (ii) determine the length of time t (e.g., initiating a count of known time increments in response to an "end of period T" indication and ending the count at the end of ton, when switch 240 is turned off).

Figure 6:
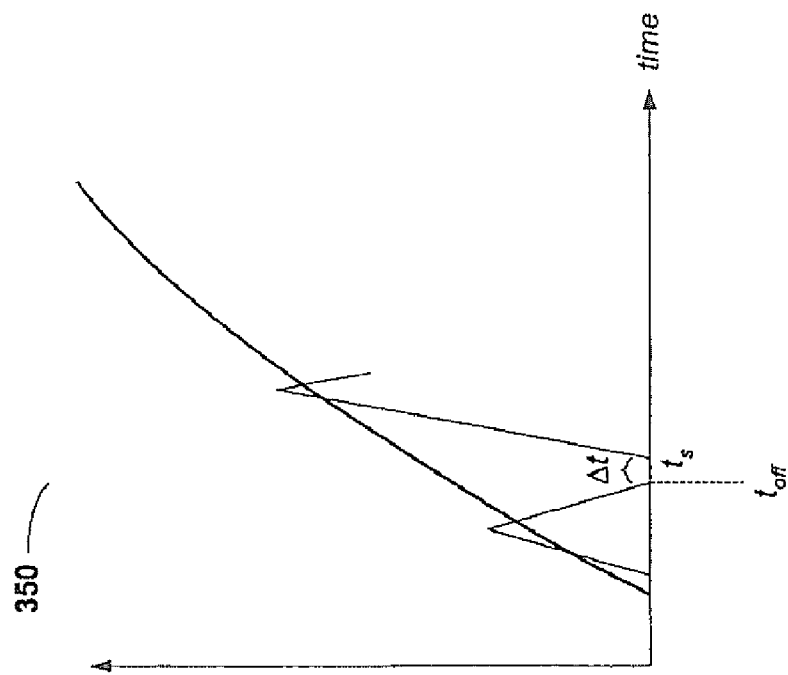
FIGS. 5-6 are graphs of low-voltage and low-current waveforms useful for explaining the operation of the exemplary boost converter of FIG. 4.

As described above, it is generally not desirable to turn switch 240 on too soon in the critical mode. However, it is possible to do so when Vout fluctuates (e.g., due to small ripples) and/or when one underdetermines the value of t. As a result, and now referring to FIG. 6, one may add a small amount of time Δt to toff to provide a kind of buffer against turning on switch 240 too soon. Thus, ts, the time at which switch 240 turns on for a second time in the critical mode, may equal ton+toff+Δt. Alternatively, from the viewpoint of power factor controller 230 (see FIG. 4), where toff is the actual length of time that switch 240 is off in a given on/off cycle, $$toff=[ton*Vin/(Vout-Vin)]+\Delta t \quad [5]$$

Figure 7:
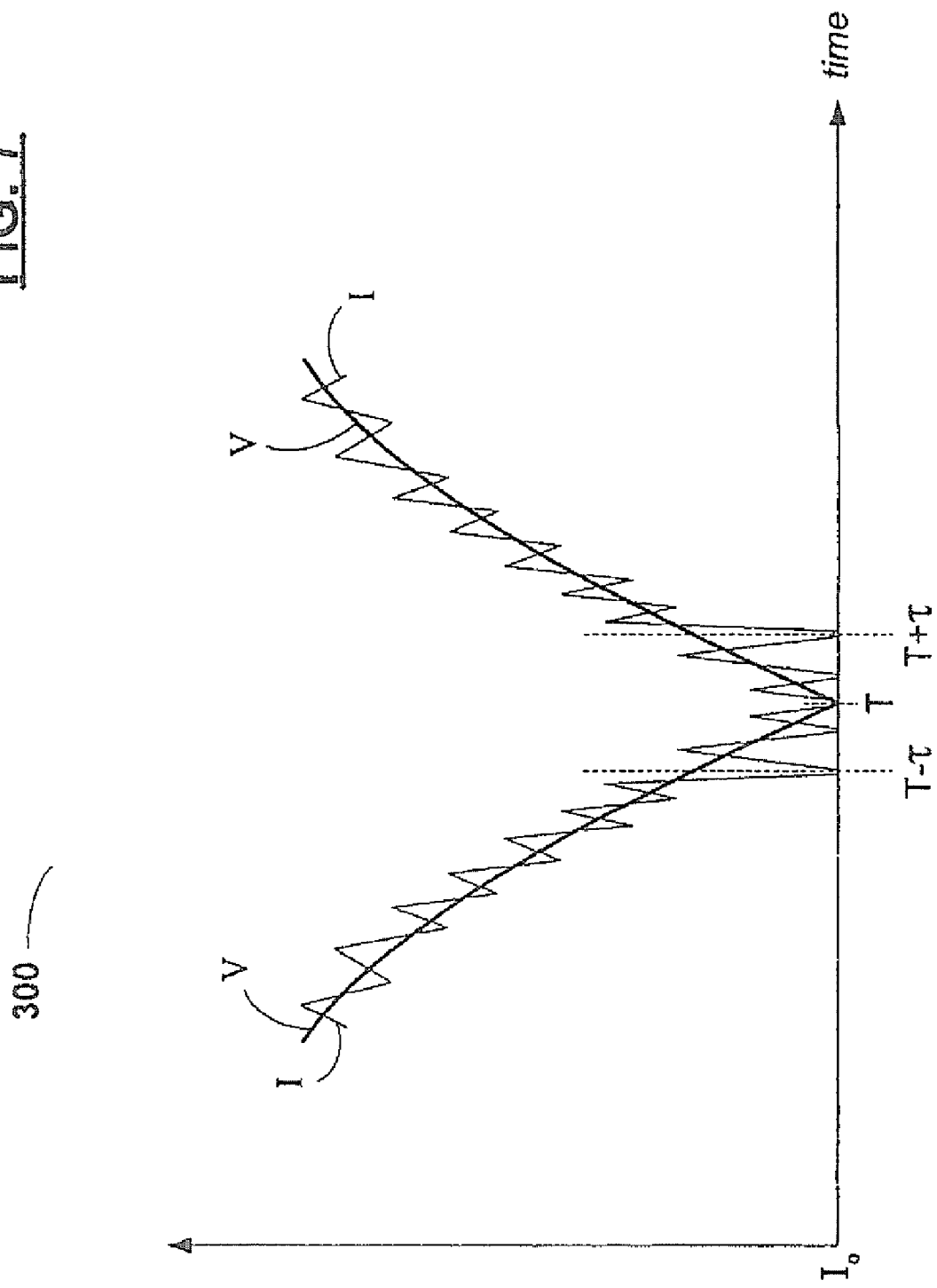
FIG. 7 is a graph depicting voltage and current waveforms for both decreasing and increasing values of the voltage half-sine wave useful for explaining the operation of the exemplary boost converter of FIG. 4.

In one embodiment, the transitions between the average current and critical modes of operation can be determined mathematically. Referring now to the graph in FIG. 7, two transition periods are shown, one on each side of the end of voltage half-sine wave period T. The period of time τ shown in FIG. 7 is effectively the half-period of time in which boost converter 200 is in the critical mode. The critical mode time is effectively 2*τ because the voltage half-sine wave and the current waveform I is symmetric about the time=T axis. Outside of the time from (T−τ) to (T+τ), boost converter 200 is in the average current mode.

When boost converter 200 is in the critical mode, the current waveform I intersects the I0 axis. As a result, ts (which in this embodiment is the time of the on/off cycle of switch 240; please see FIG. 4) is necessarily longer than ton+toff (where toff is the time that it takes current waveform I to reach I0 when switch 240 is off). Mathematically, referring back to FIG. 6, when (ton+toff)<ts, then boost converter 200 is in the critical mode. Conversely, when (ton+toff)>ts, then boost converter 200 is in the average current mode.

An Exemplary Power Factor Controller

A central aspect of the disclosure relates to a power factor controller, comprising (a) a circuit configured to identify (i) a period of a periodic power signal and (ii) a length of time from a beginning of the period during which a potential is applied to a power conversion switch (e.g., ton); (b) a voltage calculator configured to determine at least a peak voltage of the periodic power signal; and (c) logic configured to calculate a time period to open the switch in response to (i) the length of time, (ii) the power signal period, and (iii) the peak voltage. Thus, the present power factor controller identifies (i) the power signal period and (ii) the time length that the power conversion switch charges the power converter, determines the peak voltage of the periodic power signal, and calculates a time period during which the power conversion switch is turned off in response to (1) the "on" time of the switch, (2) the power signal period, and (3) the peak voltage. In the context of the present power factor controller, the term "identify" may refer to receiving and/or providing a predetermined value for the power signal period and/or the time length ton, calculating or computing such values from one or more other parameter values, or determining such values using conventional techniques for doing so (e.g., counting time increments of predetermined or known length, from a known initiation or starting point to a known termination or ending point). Typically, the periodic power signal comprises an alternating current power signal or a rectified AC power signal.

In various embodiments, the present power factor controller may further comprise (a) a voltage detector configured to determine a zero voltage at an input to the power converter; (b) one or more counters configured to initiate counting (i) the power signal period and/or (ii) the length of time in response to a signal from the voltage detector indicating the zero voltage; (c) a comparator configured to compare the power signal voltage to a first reference voltage and provide a first relative voltage value to the voltage calculator; (d) a filter configured to reduce or remove harmonic noise from the power converter output (e.g., from an output voltage feedback signal); and/or (e) a filter configured to reduce or remove noise from a current feedback signal.

In other embodiments, the logic comprises a digital signal processor, and/or the logic is further configured to calculate the time period(s) when a power converter comprising the switch is in a critical mode, or apply the potential to the switch for a predetermined period of time when a power converter comprising the switch is in a critical mode. Thus, the present power factor controller may process one or more digital signals (typically a plurality of such signals, as will be explained in greater detail with regard to FIG. 8). As a result, the present power factor controller may further comprise one or more (and typically a plurality) of analog-to-digital (A/D) converters configured to convert an analog signal input into the power factor controller to a multi-bit digital signal to be processed by the power factor controller logic/digital signal processor. As is known in the art, the number of bits in an A/D converter corresponds to its resolution; the greater the number of bits, the higher the resolution (and the greater the chip real estate, processing power needed, and cost of the power factor controller).

Figure 8:
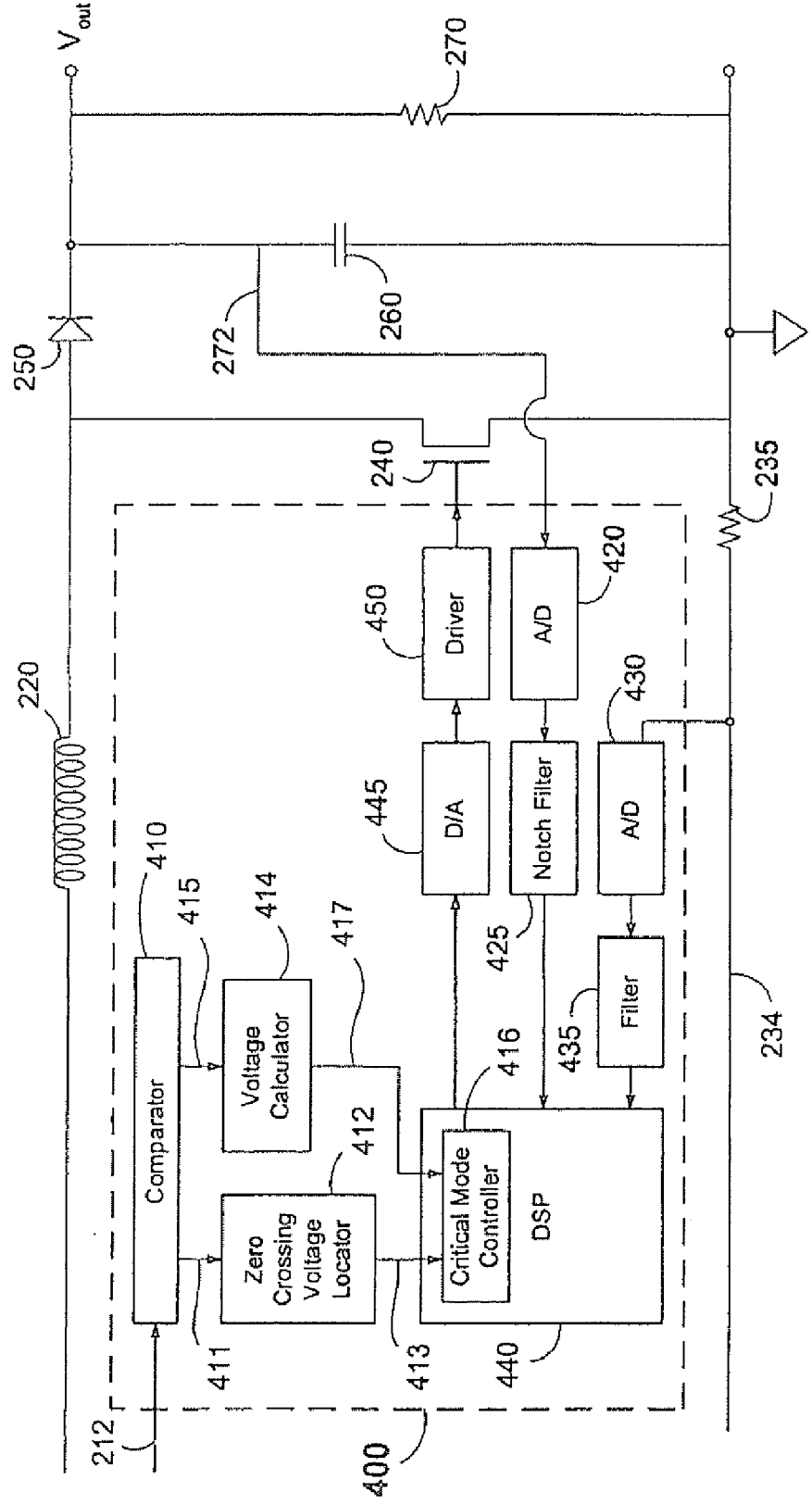
FIG. 8 is a diagram of another exemplary power factor controller according to the present disclosure.

FIG. 8 shows an exemplary power factor controller 400 according to the present disclosure. Power factor controller 400 generally comprises comparator block 410, zero voltage crossing locator 412, voltage calculator 414, input A/D converters 420 and 430, filters 425 and 435, digital signal processor 440 including critical mode controller 416, output digital-to-analog (D/A) converter 445 and output driver 450, which sends a control signal to open or close power conversion switch 240 (and if to close switch 240, apply a certain potential to switch 240). The disclosure focuses on critical mode controller 416 and the inputs thereto.

Comparator block 410 receives periodic (AC) power signal from AC power line 212. Given the known relationship between the signal from AC power line 212 and the rectified version thereof (e.g., rectified AC power signal 216 in FIG. 4), one skilled in the art can easily perform the calculations described above from AC power line 212, while avoiding any latency that may be introduced into the power conversion process by rectifier 210. Comparator block 410 may comprise a comparator block of two or more comparators, in which first and second individual comparators compare the voltage on AC power line 212 with a first and second reference voltages, respectively, the first and second reference voltages being different from one another.

In one implementation, the first comparator in comparator block 410 compares the voltage on AC power line 212 with a reference voltage having a value of zero volts (0 V), then provides the comparison output 411 to zero voltage crossing locator 412, which transmits appropriate information and/or control signals to critical mode controller 416 in response to the outcome of the comparison. The output 411 from the first comparator may be analog or digital, but the output 413 of zero voltage crossing locator 412 is typically digital. It is well within the abilities of those skilled in the art to design and implement logic capable of such functions. For example, when output 411 is analog, zero voltage crossing locator 412 typically comprises an A/D converter and output 413 is a multi-bit digital signal carrying information about the value of the voltage on AC power line 112 relative to 0 V. However, when output 411 is digital (i.e., the first comparator identifies when the AC voltage 212 is 0 V or not), zero voltage crossing locator 412 typically comprises control logic and output 413 is a single- or multi-bit digital signal configured to instruct various circuits and/or logic in critical mode controller 416 to perform (or stop performing) one or more functions in response to the AC voltage 212 being 0 V.

In another implementation, the second comparator in comparator block 410 is a conventional peak detector configured to determine the maximum voltage on AC power line 212 from cycle to cycle (e.g., either AC power signal cycle or the rectified AC signal half-cycle), then provide an output 415 to voltage calculator 414, which transmits appropriate information and/or control signals to critical mode controller 416 in response to the peak detector output 415. The output 415 from the second comparator may be analog or digital, but the output 417 of voltage calculator 414 is typically digital. It is well within the abilities of those skilled in the art to design and implement logic capable of such functions. For example, when output 415 is analog, voltage calculator 414 typically comprises an A/D converter and output 417 is a multi-bit digital signal carrying information about the value of the peak voltage on AC power line 212. However, when output 415 is digital (i.e., the second comparator compares the voltage of AC power line 212 to a plurality of reference voltages and provides a multi-bit digital output identifying the voltage range that the peak voltage is in), voltage calculator 414 typically comprises control logic and output 417 is a single- or multi-bit digital signal configured to instruct various circuits and/or logic in critical mode controller 416 to adjust, perform or stop performing one or more functions in response to changes in the peak AC voltage on AC power line 212.

Critical mode controller 416 is configured to compute or calculate at least two things: the power signal input voltage (e.g., Vin) from the peak voltage (Vp) and the length of time that switch 240 is on in the critical current mode (ton); and the time period during which switch 240 is off (e.g., toff above) when the power converter comprising inductor 220 (and/or otherwise in electrical communication with switch 240) is in the critical mode, from Vin, Vout and ton.

Thus, critical mode controller 416 is generally configured to calculate Vin from the peak AC voltage on AC power line 212 (provided by output 417 from voltage calculator 414), the half-period of the AC power signal (equivalent to the period of the rectified AC power signal and equal to the time difference between points when the voltage on AC power line 212=0 V, information that is provided by output 413 from zero voltage crossing locator 412), and the time period from when AC voltage on the AC power line 212=0 V to the end of ton. As described above, ton is a predetermined length of time that may be programmed into a memory unit in digital signal processor 440 (or elsewhere in controller 400) or that may be calculated, computed or determined conventionally by digital signal processor 440 in response to one or more appropriate inputs (e.g., a current or voltage input from AC power line 212, a power conversion feedback from output voltage Vout at node 272 and/or feedback current node 234, etc.).

Digital signal processor 440 also receives (1) a filtered, multi-bit digital signal from filter 425, corresponding to the power converter output voltage feedback signal at node 272, and (2) a filtered, multi-bit digital signal from filter 435, corresponding to the feedback current node 234. The filter 425 may be a notch filter. These circuit blocks and signals are conventional, and generally perform their conventional function(s). However, one unexpected advantage of the present disclosure is that the A/D converters 420 and 430 (particularly 430) can have lower resolution than corresponding A/D converters in conventional boost controllers. This is generally because the present computational approach to minimizing toff does not rely on high-resolution information from direct current output Vout or feedback current node 234 to try to measure accurately those periods where zero current is flowing through inductor 220. Also as described above, one may add a buffer period Δt to toff, in part to accommodate or allow for small potential accuracy errors in measuring certain parameters, such as Vp, Vout, t, T, and/or (when necessary or desired) ton.

Digital signal processor 440 outputs a multi-bit digital signal to D/A converter 445, which converts the multi-bit digital signal to an analog signal instructing output driver 450 to open or close switch 240. If switch 240 is to be closed, the analog signal received by driver 450 informs driver 450 what potential to apply to the gate of switch 240. Alternatively, output driver 450 may comprise a plurality of driver circuits in parallel, each receiving one bit of the multi-bit digital signal output by digital signal processor 440, thereby avoiding a need for D/A converter 445.

Exemplary Methods

The present disclosure further relates to method of controlling a power converter, comprising the steps of (a) storing energy from a periodic power signal in the power converter in response to application of a potential to switch in electrical communication with the power converter; (b) calculating a time period to open the switch (e.g., toff) from (i) an initial length of time during which a potential is applied to the switch (e.g., ton), (ii) a period of the periodic power signal (e.g., T), and (iii) a peak voltage of the periodic power signal (e.g., Vp); and (c) opening the switch during the time period. As for the descriptions of hardware above, the periodic power signal may comprise an alternating current power signal or a rectified AC power signal, depending on design choices and/or considerations. The energy is typically stored in an inductor when a current from a rectified AC power signal passes through the inductor, and current generally passes through the inductor when the switch is closed. Energy typically is not stored in the boost converter (inductor) when the switch is open.

In various embodiments, the method may further comprise the step(s) of: (1) determining a zero voltage at an input to the power converter; (2) timing, or identifying or determining a time length for, (i) the power signal period and/or (ii) the length of time in response to a zero voltage indication; (3) determining the peak voltage of the periodic power signal; (4) calculating the time period or otherwise identifying when the power converter is in a critical mode; (5) filtering harmonic noise from an output of the power converter; and/or (6) filtering noise from a current feedback signal. Each of these additional steps is generally performed as described above with respect to the corresponding hardware configured to conduct, practice or implement the step.

In certain implementations, the step of determining the peak voltage may comprise comparing a voltage of the periodic power signal to a first reference voltage, sampling an output of the comparing step to generate a plurality of power signal voltage samples, and determining a maximum power signal voltage sample value, the peak voltage corresponding to the maximum power signal voltage sample value. Also, the present method generally further comprises the step of applying a potential to the switch for a predetermined period of time when the power converter is in the critical mode.

Exemplary Software

The present disclosure also includes algorithms, computer program(s) and/or software, implementable and/or executable in a general purpose computer or workstation equipped with a conventional digital signal processor, configured to perform one or more steps of the method and/or one or more operations of the hardware. Thus, a further aspect of the disclosure relates to algorithms and/or software that implement the above method(s). For example, the disclosure may further relate to a computer program, computer-readable medium or waveform containing a set of instructions which, when executed by an appropriate processing device (e.g., a signal processing device, such as a microcontroller, microprocessor or DSP device), is configured to perform the above-described method and/or algorithm.

For example, the computer program may be on any kind of readable medium, and the computer-readable medium may comprise any medium that can be read by a processing device configured to read the medium and execute code stored thereon or therein, such as a floppy disk, CD-ROM, magnetic tape or hard disk drive. Such code may comprise object code, source code and/or binary code.

The waveform is generally configured for transmission through an appropriate medium, such as copper wire, a conventional twisted pair wireline, a conventional network cable, a conventional optical data transmission cable, or even air or a vacuum (e.g., outer space) for wireless signal transmissions. The waveform and/or code for implementing the present method(s) are generally digital, and are generally configured for processing by a conventional digital data processor (e.g., a microprocessor, microcontroller, or logic circuit such as a programmable gate array, programmable logic circuit/device or application-specific [integrated] circuit).

In various embodiments, the computer-readable medium or waveform comprises at least one instruction (or subset of instructions) to (a) count predetermined time units corresponding to (i) the power signal period and/or (ii) the length of time, in response to an indication of a zero voltage on the periodic power signal; (b) determine (e.g., compute or calculate) the peak voltage; and/or (c) determine and/or indicate (e.g., by calculating a corresponding time period) when the power converter is in the critical mode. In one implementation, the instruction(s) to determine the peak voltage comprise at least one subset of instructions to (i) sample an output of a comparison of the periodic power signal voltage to a reference voltage, (ii) store a plurality of power signal voltage samples, and (iii) determine a maximum power signal voltage sample value, the peak voltage corresponding to the maximum power signal voltage sample value.

Thus, the present disclosure provides a circuit, system, method and software for controlling a power conversion and/or correcting and/or controlling a power factor in such conversion(s). The circuitry generally comprises a power factor controller, comprising (a) a circuit configured to determine and/or identify (i) a period of a periodic power signal and (ii) a length of time from a beginning of the period during which a potential is applied to a power conversion switch; (b) a voltage calculator configured to determine at least a peak voltage of the periodic power signal; and (c) logic configured to calculate a time period to open the switch in response to (i) the length of time, (ii) the power signal period, and (iii) the peak voltage. The system generally comprises the present power factor controller and a switch that it controls, although the system aspect of the disclosure also relates to a power converter comprising the present power factor controller, the switch, and an inductor configured to store energy from the periodic power signal.

The method generally comprises the steps of (1) storing energy from a periodic power signal in a power converter in response to application of a potential to switch in electrical communication with the power converter; (2) calculating a time period to open the switch from (i) an initial length of time during which a potential is applied to the switch, (ii) a period of the periodic power signal, and (iii) a peak voltage of the periodic power signal; and (3) opening the switch during the time period. The software generally comprises a set of instructions adapted to carry out the present method.

The present disclosure generally takes a computational approach to reducing and/or minimizing zero current periods in the critical mode of power converter operation, and advantageously reduces zero current periods in the critical mode to a reasonable and/or tolerable minimum, thereby maximizing the power factor of the power converter in the critical mode and reducing noise that may be injected back into AC power lines. The present power factor controller allows for greater design flexibility, reduced design complexity, and/or reduced resolution and/or greater tolerance for error in certain parameter measurements or samples.

Figure 9:
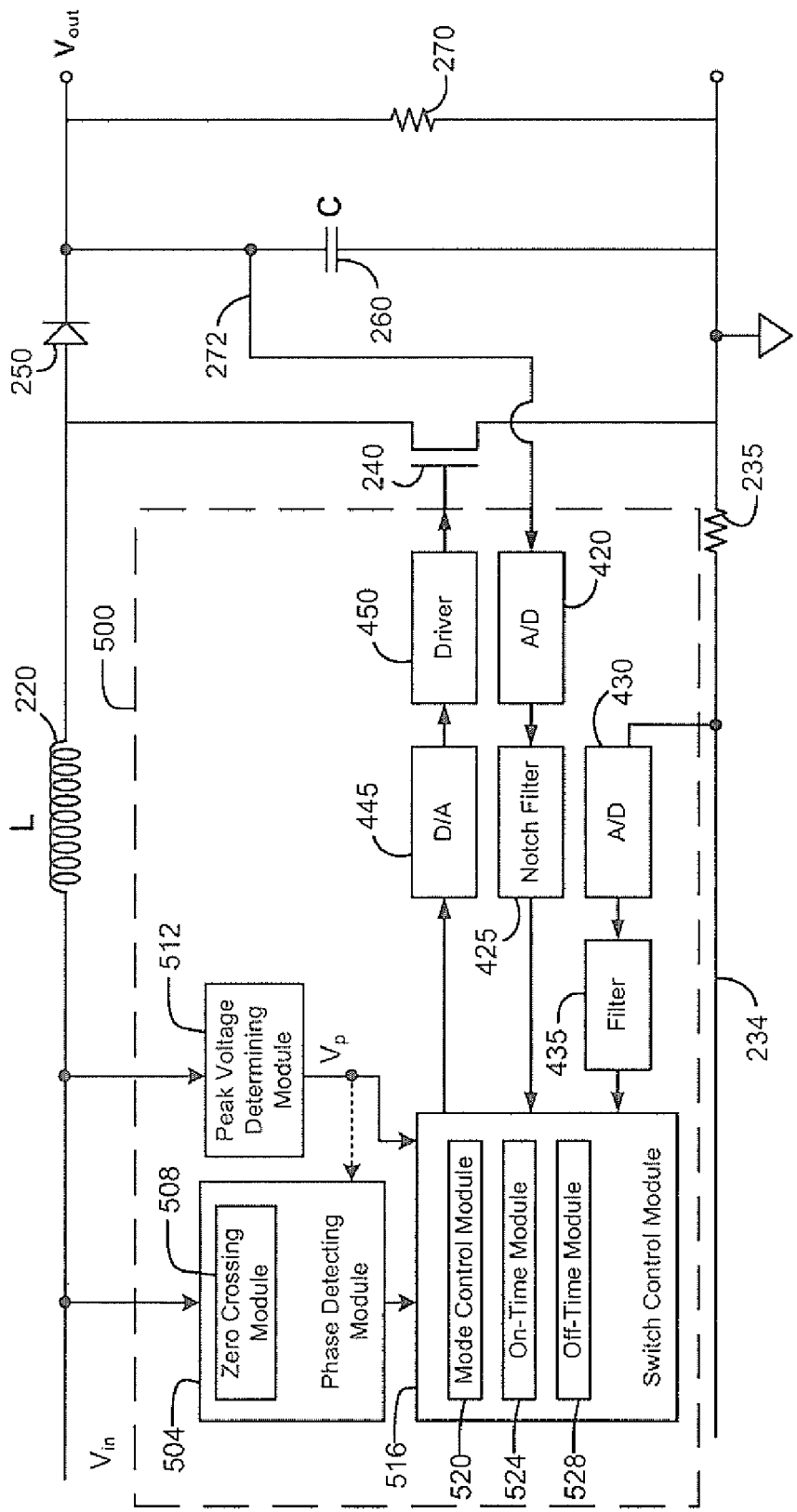
FIG. 9 is a functional block diagram of an alternate exemplary power factor controller according to the present disclosure.

Referring now to FIG. 9, an alternate power factor control module 500 switches modes of the boost converter. In some implementations, the power factor control module 500 may switch the mode from continuous mode to discontinuous mode, and/or from discontinuous mode to continuous mode during zero-crossings of the powerline input signal.

The power factor control module 500 includes a phase detecting module 504, which determines a phase θ of the input signal. The phase detecting module 504 may include a zero-crossing module 508 that detects zero-crossings of a voltage of the input signal. The phase detecting module 504 may determine the phase θ of the input signal based on the zero-crossings. In other words, the phase θ of the input signal may be 0° or 180° when the zero-crossings occur. The phase θ of the input signal may also be determined based on a peak voltage of the input signal, which may occur at 90° and 270°.

Likewise, the period T of the input signal may be determined by the phase detecting module 504. In other words, one-half of the period T of the input signal may be equal to a period between two adjacent zero-crossings or between two voltage peaks. Alternately, the period T may be set to a constant value if known.

The power factor control module 500 may further comprise a peak voltage determining module 512 that determines a peak voltage of the input signal. The peak voltage determining module 512 may sample and hold the input voltage to identify the peak voltage. In other words, the sample and hold continues until the sampled value decreases relative to a preceding value. Other techniques may be used to identify timing and/or magnitude of the peak voltage. The peak voltage determining module 512 may output the peak voltage VP to the phase detecting module 504 to help estimate the phase θ of the input signal.

The power factor control module 500 may further comprise a switch control module 516 that controls a state of the switch and a switching frequency of the switch. The phase detecting module 504 may output the period T, the phase θ and/or zero-crossing signals of the powerline input signal to the switch control module 516. The peak voltage determining module 512 may output peak voltage signals VP such as magnitude and/or timing of the powerline input signal to the switch control module 516.

The switch control module 516 may further comprise a mode control module 520 that selects a mode of the boost converter. For example, the mode may be set to a continuous mode, a discontinuous mode or a critical mode. The mode control module 520 may also be arranged outside of the switch control module 516 and/or combined with another module of the power factor control module 500.

The mode control module 520 may select the mode and determine whether to switch modes based on sensed operating parameters. For example only, the mode control module 520 may determine when to switch the mode from the continuous mode to the discontinuous mode or from the discontinuous mode to the continuous mode based on the zero-crossing signals. For example only, the switching may be done within a predetermined period of a powerline zero-crossing. However, the switching between modes may also occur at different phase locations of the powerline input signal (in addition to or instead of switching at zero-crossing of the voltage of the powerline input signal). Switching from the continuous mode or discontinuous mode to the critical mode may also be done at these times.

The mode control module 520 may generate a control signal for switching the mode from the continuous mode to the discontinuous mode or from the discontinuous mode to the continuous mode based on the zero-crossing signals, phase and/or other sensed operating parameters. Based on the selected mode, the switch control module 516 also selects the frequency of the switch.

The switch control module 516 may include an on-time module 524 that sets an on-time period ton for the switch 240 as described herein. The on-time period ton may be a constant value or adjustable. The switch control module 516 may include an off-time module 528 that sets an off-time period toff for the switch 240 as described herein.

Figure 10B:
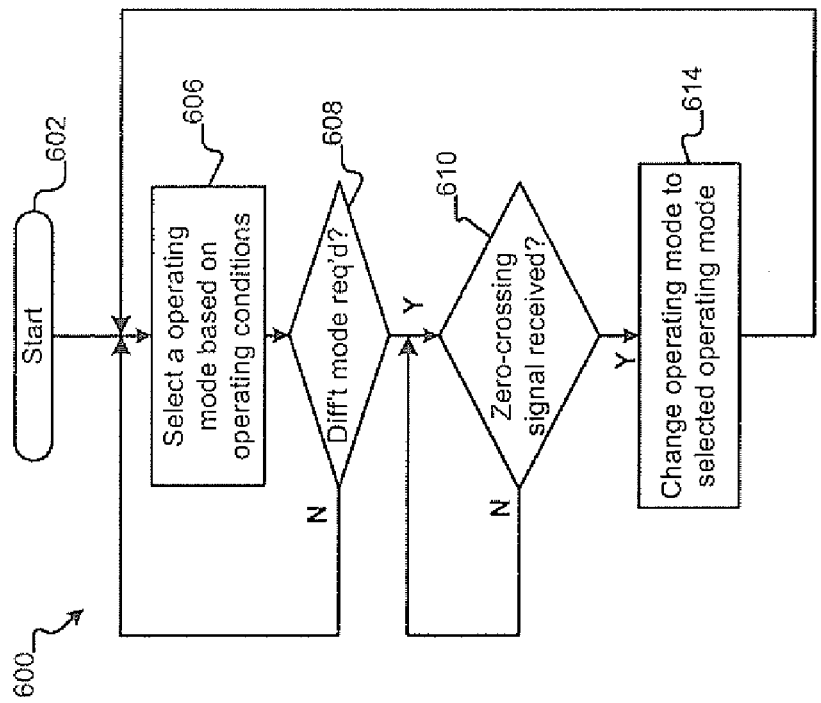
FIG. 10B illustrates a method for controlling transitions between modes based on voltage zero crossings.
Figure 10A:
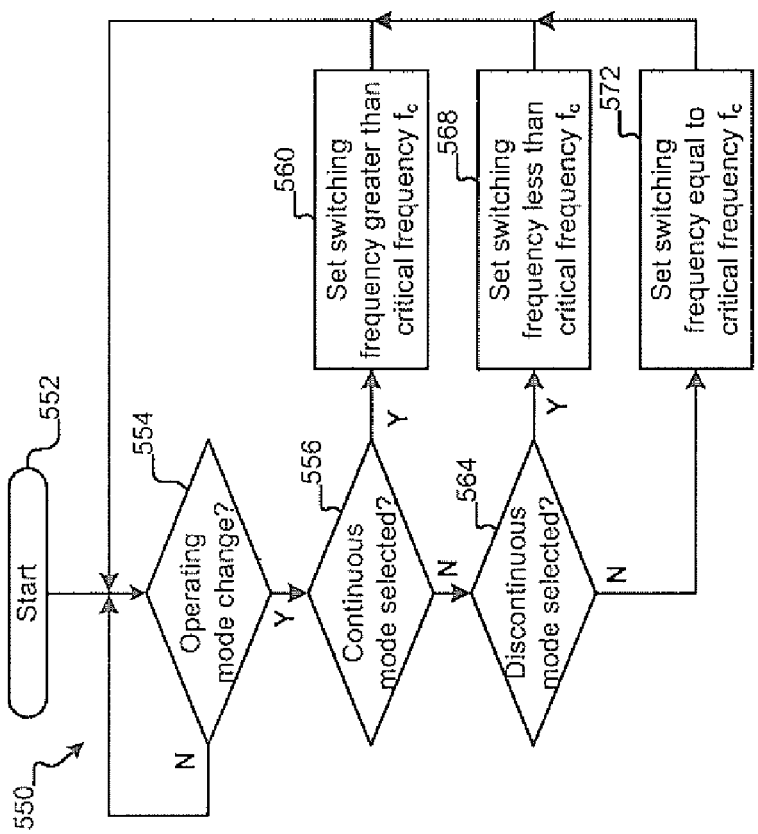
FIG. 10A illustrates a method for controlling switching frequency based on a mode of the boost converter.

Referring now to FIG. 10A, a method 550 for adjusting a switching frequency of the boost converter begins with step 552. In step 554, control determines whether there has been a requested operating mode change. If step 554 is false, control returns to step 554. If step 554 is true, control continues with step 554 and determines whether the continuous mode has been selected. If true, control sets the switching frequency greater than the critical frequency fc in step 560.

If step 554 is false, control determines whether the discontinuous mode has been selected in step 564. If step 564 is true, control sets the switching frequency fc less than the critical frequency in step 568. If step 564 is false, control defaults to the critical mode and sets the switching frequency equal to the critical frequency fc in step 572.

As can be appreciated, the switching between modes can be performed at any time. In some implementations, the switching frequency can be set as shown in FIG. 10A and switching is performed at any time during the cycle of the power input signal. In some implementations, the switching frequency can be set as shown in FIG. 10A and switching is performed at voltage zero crossings as shown in FIG. 10B.

Referring now to FIG. 10B, a method 600 switching modes of the boost converter at voltage zero crossings begins at step 602. The mode control module may select a mode (e.g., the continuous mode, the critical mode or the discontinuous mode) in step 606 based on operating conditions such as Vout, load conditions and/or other operating parameters. Control determines in step 608 whether the mode control module 520 requests a mode change. For example, the mode may change from one of the continuous mode, the critical mode or the discontinuous mode to another one of the continuous mode, the critical mode or the discontinuous mode.

In step 610, the mode control module 520 determines whether the zero-crossing module 508 detects a zero-crossing. If the result of step 610 is false, the mode control module 520 waits until the zero-crossing module detects a zero-crossing. If the result of step 610 is true, the mode control module 520 switches the mode to the selected mode in step 614.

The switching frequency in the continuous mode may be greater than the switching frequency in the discontinuous mode. Specifically, the switching frequency in the continuous mode may be determined based on factors including a power rating of the boost converter, the estimated load, and values of components (for example only, the inductor 220 and the capacitor/filter 260).

For example only, the switching frequency in the continuous mode may be between 500 KHz and 2 MHz. For example only, the switching frequency in the continuous mode may be 1 MHz. The switching frequency in discontinuous mode may be based on or proportional to the estimated load current.

Figure 11:
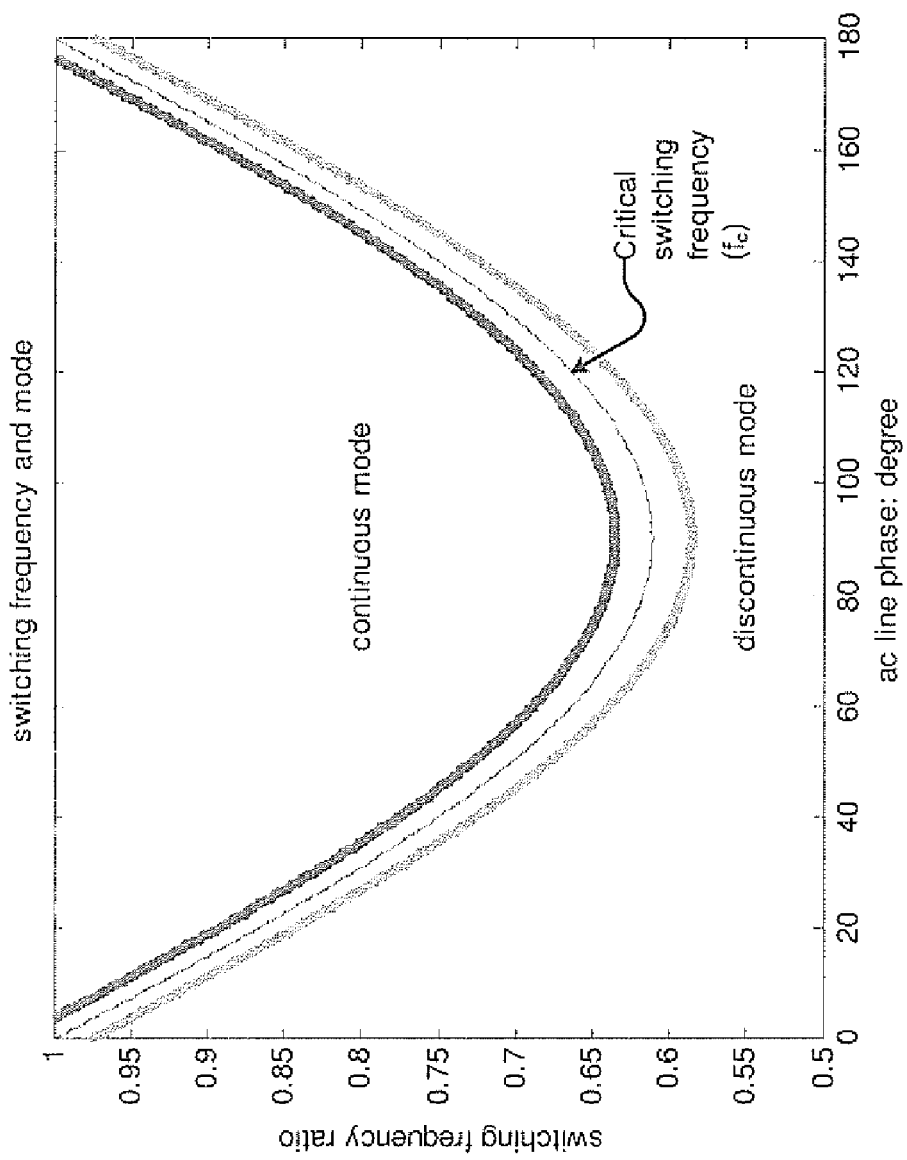
FIG. 11 illustrates a switching frequency ratio as a function of AC line phase for the continuous and discontinuous modes.

Referring now to FIG. 11, the switch control module 516 may set the switching frequency based on a phase of the powerline input signal. Specifically, the switching frequency may be greater than a critical or threshold switching frequency fc in continuous mode and may be less than the critical switching frequency fc in discontinuous mode. The critical switching frequency fc may be given by the following formula:

$$fc=0.25*(Vp2)*(1-Vp*\sin(\theta)/Vo)/(Po*L)$$

where Vp=1.44*VRMS is a peak value of the voltage of the powerline input signal (e.g., Vp=144 volts when VRMS=110 volts), Vo is an output voltage of the boost converter, Po is an output power of the boost converter, L is an inductance, and θ is the phase of the powerline input signal.

A maximum value of the critical switching frequency fc may be given by the following formula.

$$f\max=0.25*(Vp2)/(Po*L).$$

Accordingly, the critical switching frequency fc may be expressed as a product of fmax and a frequency ratio fratio as follows.

$$fc=f\max*fratio$$

where fratio is a ratio of the switching frequency to the maximum value of the critical switching frequency and is given by $$fratio=(1-Vp*\sin(\theta)/Vo).$$

The foregoing descriptions of specific embodiments of the present disclosure have been presented for purposes of illustration and description. They are not intended to be exhaustive or to limit the disclosure to the precise forms disclosed, and obviously many modifications and variations are possible in light of the above teaching. The embodiments were chosen and described in order to best explain the principles of the disclosure and its practical application, to thereby enable others skilled in the art to best utilize the disclosure and various embodiments with various modifications as are suited to the particular use contemplated. It is intended that the scope of the disclosure be defined by the Claims appended hereto and their equivalents.

What is claimed is:

1. A boost converter, comprising:
an inductance configured to (i) convert a rectified alternating current to a direct current, and (ii) output the direct current to a load;
a switch configured to bypass at least a portion of the direct current from being received by the load; and
a control module configured to (i) operate in a plurality of modes, (ii) generate a control signal, and (iii) set a frequency of the control signal based on a selected one of the plurality of modes,
wherein the switch is configured to (i) receive the control signal, and (ii) alternate between an ON state and an OFF state based on frequency of the control signal,
wherein the control module is configured to minimize time a current level of the inductance is equal to a predetermined level by changing the frequency of the control signal (i) when the current level is greater than the predetermined level and (ii) during an off period of the switch, and
wherein the control module is configured to calculate the off period to (i) begin at a peak of the current level of the inductance and (ii) send when the current level decreases to the predetermined level.

2. The boost converter of claim 1, wherein:
the control module comprises a mode control module;
the mode control module is configured to select the one of the plurality of modes; and
the plurality of modes comprises a continuous mode, a discontinuous mode and a critical mode.

3. The boost converter of claim 2, wherein the control module is configured to change the frequency of the control signal (i) during the off period of the switch and (ii) when operating in the discontinuous mode.

4. The boost converter of claim 1, wherein:
the control module comprises a switch module; and
the switch module is configured to (i) alternate the switch between the ON state and the OFF state at the frequency, (ii) set the frequency equal to a first frequency when operating in a continuous mode, and (iii) set the frequency equal to a second frequency when operating in a discontinuous mode.

5. The boost converter of claim 1, wherein the predetermined level is equal to 0.

6. The boost converter of claim 1, wherein the off period (i) begins at the peak of the current level of the inductance and (ii) ends when the current level decreases to a zero-crossing point.

7. The boost converter of claim 1, wherein the control module is configured to (i) calculate the off period of the switch for a discontinuous mode, and (ii) change the frequency of the control signal when operating in the discontinuous mode.

8. The boost converter of claim 1, wherein the off period (i) begins when the switch is switched to the OFF state and (ii) ends when the current level is equal to 0.

9. The boost converter of claim 1, wherein the control module is configured to determine the off period and set the frequency independent of measuring the current level through the inductance.

10. The boost converter of claim 1, wherein the control module is configured to determine the off period using triangulation and based on a plurality of parameters.

11. The boost converter of claim 10, wherein the parameters comprise (i) a time when the switch is switched to the ON state, (ii) a first voltage of an input of the boost converter, (iii) a peak of the first voltage, and (iv) a second voltage at the load.

12. The boost converter of claim 1, wherein the control module comprises:
a phase detecting module configured to determine a period of the alternating current;
a peak module configured to determine a peak voltage at an input of the boost converter;
an on-time module configured to determine an on-time of the switch; and
an off-time module configured to determine the off period based on the period of the alternating current, the peak voltage and the on-time.

13. The boost converter of claim 12, wherein the off-time module determines the off period independently of measuring the current level through the inductance.

14. The boost converter of claim 12, wherein:
the phase detecting module is configured to detect a zero-crossing of a voltage at the input of the boost converter; and
the control module is configured to control transitions between a discontinuous mode and a continuous mode based on the zero-crossing.

15. The boost converter of claim 1, wherein the control module is configured to:
detect a phase of the alternating current;
set a threshold frequency based on the phase;
set the frequency of the control signal to a first frequency when operating in a continuous mode, wherein the first frequency is greater than the threshold frequency; and
set the frequency of the control signal to a second frequency when operating in a discontinuous mode, wherein the second frequency is less than the threshold frequency.

16. The boost converter of claim 15, wherein the control module determines the threshold frequency based on (i) the phase, (ii) a peak of a voltage at an input of the boost converter, (iii) an output power level of the boost converter, and (iv) a value of the inductance.

17. The boost converter of claim 15, wherein the control module is configured to:
determine the threshold frequency based on a product of a maximum threshold frequency and a first value;
determine the maximum threshold frequency based on (i) a peak of a voltage of an input of the boost converter, (ii) an output power level of the boost converter, and (iii) a value of the inductance; and
determine the first value based on (i) the peak voltage of the input and (ii) the output power level of the boost converter.

18. A boost converter, comprising:
an inductance configured to (i) convert a rectified alternating current to a direct current, and (ii) output the direct current to a load;
a switch configured to bypass at least a portion of the direct current from being received by the load; and
a control module configured to (i) generate a control signal, and (ii) set a frequency of the control signal,
wherein the switch is configured to (i) receive the control signal, and (ii) alternate between an ON state and an OFF state based on frequency of the control signal,
wherein the control module is configured to minimize time in a critical mode by changing the frequency of the control signal (i) when a current level of the inductance is greater than a predetermined level and (ii) during an off period of the switch, and
wherein the control module is configured to calculate the off period to (i) begin when the switch is switched to the OFF state and (ii) send when the current level of the inductance decreases to the predetermined level.

19. The boost converter of claim 18, wherein:
the off period begins at a peak of the current level of the inductance; and
the control module is configured to prevent the current level of the inductance from decreasing to the predetermined level by changing the frequency of the control signal during the off period of the switch.

20. The boost converter of claim 18, wherein the control module is configured to:
detect a phase of the alternating current;
set a threshold frequency based on the phase;
set the frequency of the control signal to a first frequency when operating in a continuous mode, wherein the first frequency is greater than the threshold frequency;
set the frequency of the control signal to a second frequency when operating in a discontinuous mode, wherein the second frequency is less than the threshold frequency;
determine the threshold frequency based on a product of a maximum threshold frequency and a first value;
determine the maximum threshold frequency based on (i) a peak of a voltage of an input of the boost converter, (ii) an output power level of the boost converter, and (iii) a value of the inductance; and
determine the first value based on (i) the peak voltage of the input, and (ii) the output power level of the boost converter.

21. The boost converter of claim 1, wherein the control module is configured to:
calculates the off period;
adds a predetermined amount of time to the off period; and
changes state of the switch from the OFF state to the ON state when the off period and the predetermined amount of time lapses.

22. A boost converter, comprising:
an inductance configured to (i) convert a rectified alternating current to a direct current and (ii) output the direct current to a load;
a switch configured to bypass at least a portion of the direct current from being received by the load; and
a control module configured to (i) operate in a plurality of modes, (ii) generate a control signal, and (iii) set a current frequency of the control signal based on a selected one of the plurality of modes,
wherein the switch is configured to (i) receive the control signal and (ii) alternate between an ON state and an OFF state based on the current frequency of the control signal,
wherein the control module is configured to (i) calculate a predicted off period when the current frequency of the control signal is equal to a first frequency, and then (ii) prevent a current level of the inductance from decreasing to a predetermined level by changing the current frequency of the control signal from the first frequency to a second frequency during an actual off period of the switch, and
wherein the predicted off period is calculated to (i) begin at a peak of the current level of the inductance and (ii) end when the current level decreases to the predetermined level.

* * * * *